United States Patent [19]

Petersen

[11] 4,249,869
[45] Feb. 10, 1981

[54] SUPPORT FOR GLASS REPAIR APPARATUS

[75] Inventor: Paul S. Petersen, Minnetonka, Minn.

[73] Assignee: Novus Inc., Minneapolis, Minn.

[21] Appl. No.: 97,822

[22] Filed: Nov. 27, 1979

[51] Int. Cl.³ ............................ B29F 5/00; B29C 11/00
[52] U.S. Cl. ........................................ 425/13; 425/12;
264/36; 156/94
[58] Field of Search ................ 425/11, 12, 13; 264/36

[56] References Cited
U.S. PATENT DOCUMENTS

| | | | |
|---|---|---|---|
| 3,562,366 | 2/1971 | Sohl | 264/36 X |
| 3,988,400 | 10/1976 | Luhman | 264/36 |
| 3,993,520 | 11/1976 | Werner et al. | 425/13 X |
| 4,032,272 | 6/1977 | Miller | 425/12 |
| 4,047,863 | 9/1977 | McCluskey et al. | 425/13 |

OTHER PUBLICATIONS

Pamphlet: Glass Master Processes for Repair of Glass, Wilkinson Enterprises Inc., Tigard, Oregon.

Primary Examiner—J. Howard Flint, Jr.
Attorney, Agent, or Firm—Kinney, Lange, Braddock, Westman and Fairbairn

[57] ABSTRACT

A support for supporting a glass panel repair apparatus, including a frame which is removably attached to the glass panel and supports an applicator device for placing a repair liquid material, such as a resin, into a crack or damaged area of the glass panel. The frame is supported on a suction cup and includes a portion which permits repairs to be made adjacent edges and corners of the glass panel without interference from the supporting device.

7 Claims, 3 Drawing Figures

SUPPORT FOR GLASS REPAIR APPARATUS

BACKGROUND OF THE INVENTION

1. Field of the Invention

The present invention relates to support members for holding apparatus for repairing cracks or damaged areas in a glass panel.

2. Prior Art

The present device is designed specifically as an improved holdng apparatus for use with the process marketed under the Trademark Glass Master, originally sold by Wilkinson Enterprises Inc. of Tigard, Oregon. The prior art device is used for repairing plate glass primarily, and includes a plastic base that comprises a substantially triangular shaped, generally flat panel that has an O ring seal on one surface. The O ring seal is placed against the glass surface and surrounding the break area on the glass panel. A liquid resin loading barrel opening from the top into the sealed area is filled with a repair material, such as a resin. A plunger is then used for forcing the resin material into the area defined by the O ring seal, including the break area, thereby filling the break area with resin, and leaving a very thin layer over the surface of the plate glass surrounding the break area as defined by the O ring seal. After the resin has cured the base is removed and the glass is suitably finished to smooth off the area surrounding the break.

The invention herein relates to a hold-down frame for the plastic base which permits the base to be located very close to edges and corners of the glass panel being repaired and also provides a rapidly positioned support, and which is adjustable for leveling purposes.

SUMMARY OF THE INVENTION

A support member for holding a glass repair base including a suction cup hold-down section, and a repair base retaining section. The support member retaining section is triangularly shaped and cantilevers from the hold-down section to permit the repair base to be positioned closely adjacent the edges of a pane of glass to be repaired, as well as into the corners of the pane of glass. The support points for the repair base are arranged in an equilateral triangle which permits selecting the position of a resin loading barrel of the repair base for applying a liquid repair resin used in glass repair to clear adjacent obstacles or the like.

DESCRIPTION OF THE PREFERRED EMBODIMENTS

Figure 1:
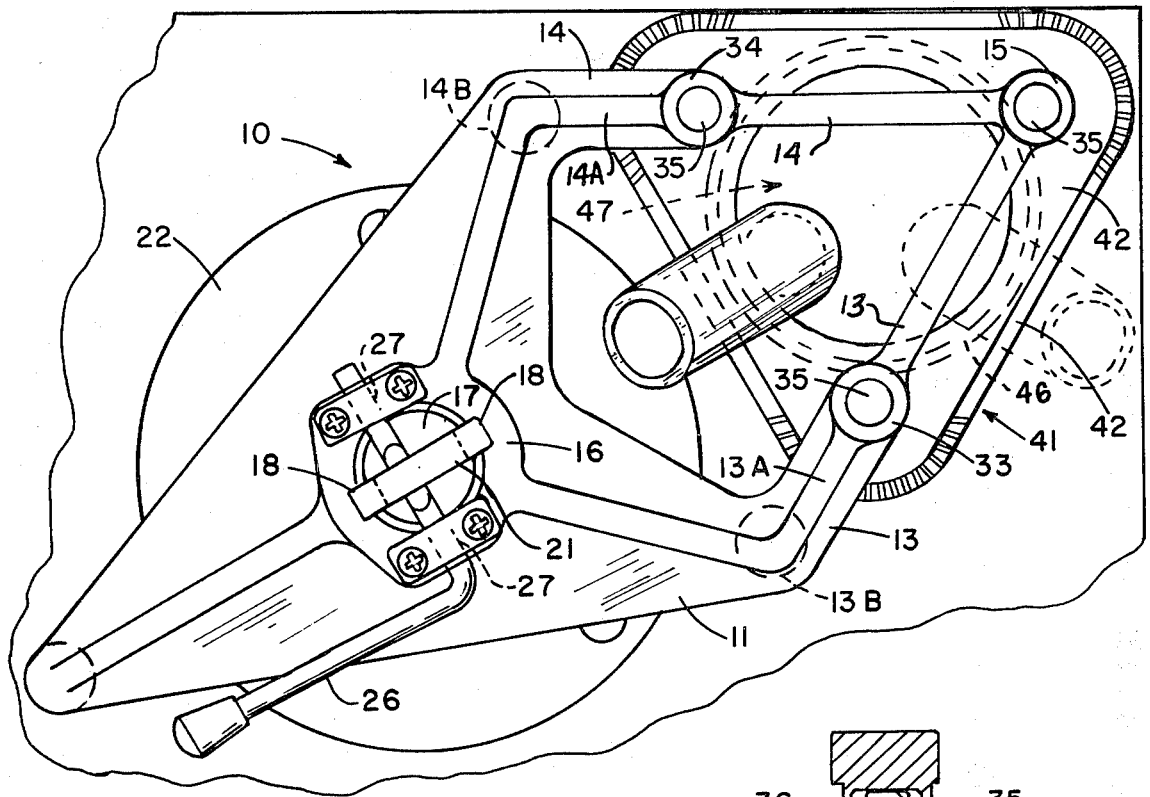
FIG. 1 is a top plan view of a support made according to the present invention showing it holding a repair base in position adjacent the corner of a pane of glass to be repaired.
Figure 3:
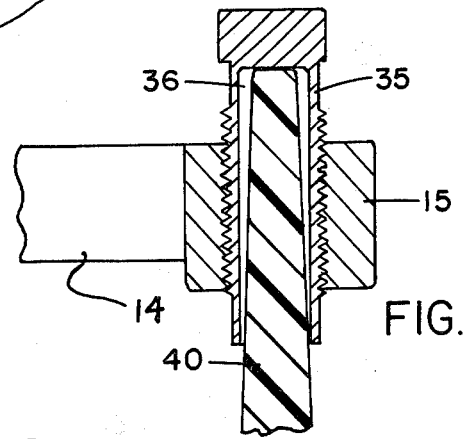
FIG. 3 is a fragmentary enlarged sectional view of a support and adjusting member for retaining the repair apparatus positioned on the support frame.

The support frame assembly of the present invention is illustrated generally at 10, and includes a base plate 11.

A first support leg 12 is mounted adjacent the base plate 11 which is triangularly shaped. The base plate 11 is used to support a pair of outwardly extending arms 13 and 14, respectively, that are spaced apart where they join base plate 11 and which taper together and join at a hub portion 15. The arms 13 and 14 can be reinforced with suitable ribs 13A and 14A, and these ribs can continue over the base plate 11 to a center column portion 16. Support legs 13B and 14B are provided at the plate 11 where the arms 13 and 14 join the plate 11.

The column 16 has a central opening indicated generally at 17, and a pair of guideways 18,18 defined diametrically opposite each other and of size to receive a tang member 21 that is attached to a suction cup assembly 22. The suction cup assembly 22 is a conventional unit that will adhere to a panel 25 that is to be repaired.

Figure 2:
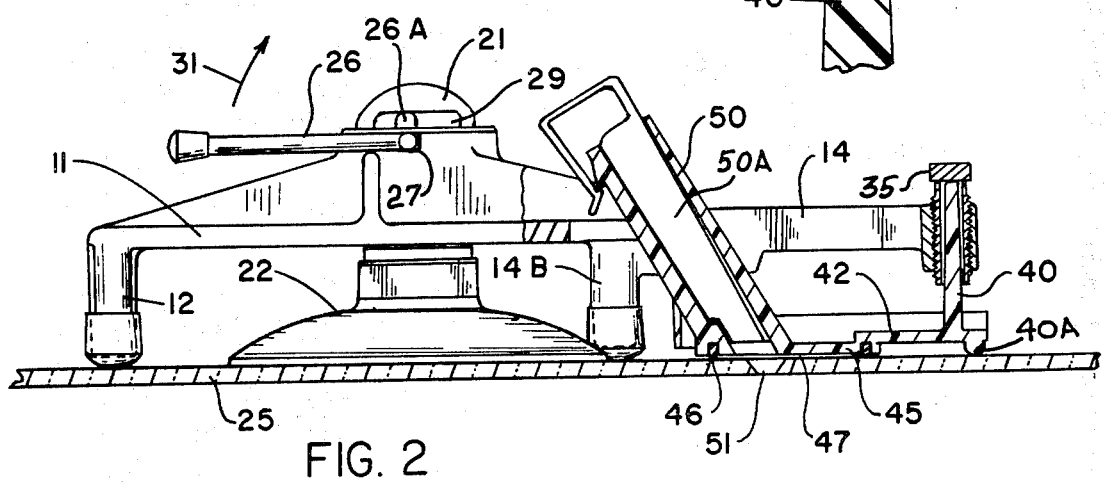
FIG. 2 is a side view of the device of FIG. 1 with parts in section and parts broken away.

The entire frame assembly 10 can be urged down against the glass or panel 25 through the use of a crank arm actuator 26 that is rotatably mounted in suitable guideways indicated at 27 on top of the column 16. The actuator 26 has a crank arm portion 26A which is mounted in a suitable cam slot 29 defined in the tang 21, and when the crank arm is in its solid line position (FIG. 2) it pushes upwardly on the upper edge of the cam slot 29 and urges the frame plate 11 downwardly against the leg 12 and legs 13B and 14B.

The top of suction cup 22 will thus stretch upwardly and resiliently hold the legs 12, 13B and 14B down against the panel 25 that is being repaired. The legs can have suitable rubber tip members to prevent them marring or damaging the panel that is being repaired. The crank arm 26 can be rotated as indicated by the arrow 31 to place the crank portion 26A in a horizontal position and thus relieve the downward pressure on the frame 11 for removal of the frame assembly from the panel 25, and for initial placement of the suction cup. After the suction cup is placed on the panel the arm is actuated to its solid line position.

Intermediate the first hub 15 and the base end of the arm 13 there is a second hub 33, and intermediate the hub 15 and the base of arm 14 there is a hub 34. The hubs each have suitably threaded openings which threadably receive a separate adjustment screw 35. Each of the adjustment screws 35 has a receptacle 36 on the interior that is used for receiving one support leg 40 of a repair assembly indicated generally at 41. The repair assembly comprises a triangular shaped body or web 42 that can be made of suitable plastic and has an upstanding rim 43 around the edges for reinforcement. The web 42 has the three upright support members 40 integrally molded therewith extending generally vertically up from the web 42. The web 42 has a slightly depressed wall portion 45 that protrudes downwardly slightly from the edges of the web 42 and this wall portion 45 has a groove therein for mounting an O ring indicated at 46. The O ring 46 describes a circle, which when in position against the upper surface of the panel 25 to be repaired, seals an area indicated generally at 47 in FIG. 1. Small feet members 40A (there are three such feet) are provided to aid in positioning and leveling the web 42.

A tube or barrel 50 is sealed to the wall portion 45 that opens to the area 47 described within the perimeter of the O ring 46. The barrel protrudes at an angle with respect to the web 42, and has an open end into which a plunger and plug 50A can be inserted after a liquid resin material has been introduced into the barrel 50. The plunger 50 is pushed down, which forces the resin into the area 47 and into a break indicated generally at 51 in the panel 25.

The repair assembly 41 is known in the art. Previously individual section cups were attached to support pegs 40 to hold the assembly directly in place on a panel, or the repair apparatus was supported with a large rectangular planar overlying support that had suction cups placed at locations along its edges, making it difficult to repair any break adjacent to a edge or corner of a glass panel.

In repair of glass, the web 42 that mounts the O ring 46 and the barrel 50 can be positioned over the break 51. The web is held in the frame assembly 10 with the legs 40 placed up into the receptacles 36 of the three adjusting screws 35. The web can then be generally positioned over the break and the suction cup 22 can be forced against the glass or panel to provide a vacuum holddown, after which the arm 26 is moved to its solid line position (it would originally be upright), so that the crank portion 26A acts against the cam area 29 to force the frame assembly 10 down against the legs 12, 13B and 14B and stretch the suction cup to create a resilient load holding the frame against the panel. The legs 12, 13B and 14B form a tripod which self levels. The screws 35 then can be adjusted to provide the desired amount of pressure on the web 42 and thus on the O ring 46 to seal the area 47 and define a space surrounding the break 51. The screws 35 permit leveling of the wall portion 45 and thus of the plane of the O ring 46, as well as adjusting the force tending to compress the O ring against the surface of the panel 25. The compression amount is limited by feet 40A to keep some space between wall 45 and the panel.

A liquid resin material is then poured into the barrel 50, in a known process to fill the break 51, and plunger 50A can be used for forcing the resin into the area 47 as well as into the break 51. The plunger may be worked to remove air bubbles. In the presently practiced method, the plunger is then latched to the barrel 50 to hold the resin under a low pressure until the resin cures. After curing, the frame 10 and the repair assembly 41 are removed. The repair assembly 41 is discarded after each use because the resin will lock the plunger 50A in the barrel, but of course the frame 10 can be used with a different repair assembly 41 for a new repair.

Besides the feature of having the triangular shaped arms 13 and 14 that extend from the apex at hub 15 so that the frame and the repair assembly 41 can be placed very close to a corner of the panel 25, the adjusting members 35 are positioned in an equilateral triangle, as do the members 40. This means that the body 41 can be positioned as shown in solid lines in FIG. 1, or can be rotated 120° in either direction and held in screws 35. One alternate position is shown in dotted lines in FIG. 1, with the barrel 50 extending 120° from its solid line position, but it should be noted that the barrel 50 could be also rotated 120° in the opposite direction. The barrel will fit underneath the legs 13 and 14 in their alternate positions, such as that shown in dotted lines in FIG. 1, so that positioning of the barrel can be made to avoid interference with adjoining structures.

It is also important to note that the arms 13 and 14 forming the sides of the frame assembly 10 are within the perimeter of the web 42, and thus do not take up any space additional from that needed for the web. This permits repairs to be made very closely to the side edges of a glass panel, as well as in the corners.

In particular the support assembly 10 can be used with other types of injecting apparatus as well, but this known configuration is used as illustrative. The support frame has an outwardly extending cantilevered end portion so that there is no need for support members spanning the web 41 (or other supported apparatus) used for applying the repair resin.

It should be also noted that legs 12, 13B and 14B form a tripod support and the suction cup is within a circle circumscribed by the interior of the tripod legs.

What is claimed is:

1. A support member for holding a repair assembly for repairing a break in the surface of a panel in position over the break to be repaired, said support comprising a frame, means to support said frame on the surface of the panel, said frame having a pair of arms cantilevered therefrom and spaced from the surface of the panel, and means on said arms to hold said repair assembly against the surface of the panel with portions of the repair assembly, wherein said means to hold said repair assembly on said arms comprises at least three attachment points arranged in a symmetrical pattern about an axis substantially normal to the panel, and mating members on said repair assembly to permit said repair assembly to be rotationally positioned at preselected increments about the axis relative to said arms.

2. The combination as specified in claim 1 wherein said means to support the frame on the surface comprises a suction cup, and legs on the frame to engage the surface and hold the arms spaced from the surface.

3. The combination as specified in claim 2 wherein said arms converge in direction away from the suction cup.

4. The combination as specified in claim 1 wherein said means to support the repair assembly includes threadably adjustable members to adjust the plane of the repair assembly relative to the arms.

5. In a repair apparatus for filling breaks in a glass panel with a liquid material including injector means for applying the liquid material to a desired portion of the surface, the improvement comprising a frame, means to support said frame on the surface of the panel including legs on the frame arranged in a tripod configuration and means to urge the legs against the panel, said frame having a pair of arms cantilevered beyond the legs and spaced from the surface of the panel, means on said arms to hold said injector means against the surface of the panel with portions of the repair assembly, said arms converging in direction away from the frame.

6. The combination as specified in claim 5 wherein said means to hold said injector means on said arms comprises three attachment points arranged on an equilateral triangle, and mating members on said injector means to permit said repair assembly to be positioned at 120° increments relative to said arms.

7. The combination as specified in claim 6 wherein said means to support the injector means includes threadably adjustable members to adjust the plane of the repair assembly relative to the arms.

* * * * *